United States Patent [19]

Inaba

[11] 4,195,845
[45] Apr. 1, 1980

[54] TURNTABLE ROTATION CONTROLLING APPARATUS

[75] Inventor: Shizuo Inaba, Tokorozawa, Japan

[73] Assignee: Pioneer Electronic Corporation, Tokyo, Japan

[21] Appl. No.: 943,495

[22] Filed: Sep. 18, 1978

[30] Foreign Application Priority Data

Sep. 20, 1977 [JP] Japan .................................. 52-112938

[51] Int. Cl.² ............................................... G11B 3/00
[52] U.S. Cl. .................................... 274/9 R; 274/39 A
[58] Field of Search ................. 274/23 R, 23 B, 39 R, 274/39 A, 1 E, 9 R

[56] References Cited

U.S. PATENT DOCUMENTS

| 2,489,146 | 11/1949 | Louchheim | 274/23 R |
| 3,111,323 | 11/1963 | Zimmermann et al. | 274/23 R |
| 3,163,428 | 12/1964 | Laufer | 274/39 A |
| 3,342,499 | 9/1967 | Fukuda et al. | 274/9 R |
| 3,550,986 | 12/1970 | Takahashi | 274/15 R |
| 3,727,922 | 4/1973 | Igata | 274/15 R |

Primary Examiner—John W. Shepperd
Attorney, Agent, or Firm—Sughrue, Rothwell, Mion, Zinn and Macpeak

[57] ABSTRACT

A turntable rotation controlling apparatus for use in a record player includes a logic sum gate circuit, wherein a phono-motor for rotating the turntable is driven when the gate circuit is conductive. The gate circuit is rendered conductive in response to the horizontal movement of a tone arm and/or the vertical movement thereof.

3 Claims, 3 Drawing Figures

TURNTABLE ROTATION CONTROLLING APPARATUS

BACKGROUND OF THE INVENTION

This invention relates to a turntable rotation controlling apparatus for use in a record player, and more particularly to a turntable rotation controlling apparatus suitable for use in a record player provided with an automatic playing mechanism.

For most record players provided with an automatic playing mechanism, a device is employed such that the rotation of the turntable is effected by a phono-motor when a tone arm is horizontally moved towards the center of the turntable from the position of an arm rest. In such a mechanism, when it is desired to remove dust on a record placed on the turntable, it is general practice in the case of manual operation to perform such cleaning by horizontally moving the tone arm by one hand to cause the turntable to rotate. Such a cleaning is, however, inconvenient, since one hand is busy with the operation of the tone arm and thus the cleaning of the record must be performed by the other hand. In operation with an automatic playing mechanism, and elevation mechanism for elevating the tone arm is actuated upon receipt of a commencement instruction of the automatic playing mechanism and thereafter the tone arm is horizontally moved, thereby causing the turntable to rotate.

Accordingly, the cleaning must be performed in a zone distinct from the tone arm travelling zone so that a stylus attached to the tone arm will not be damaged. This can occur by additional contact or by dropping the tone arm. In manual operation of the tone arm, it should also be held out of the cleaning zone of the record. Since contemporary tone arms are finely balanced and constructed in sophisticated designs it is important to isolate activities that can damage the tone arm from the physical location of the tone arm. During cleaning, if the tone arm is in the vicinity of the cleaning instrument, it can be inadvertently hit or dropped.

SUMMARY OF THE INVENTION

Accordingly, the object of this invention is to provide a turntable rotation controlling apparatus in which the turntable is rotated merely by elevating the tone arm above the position of the arm when at rest.

It is another object of this invention to provide system that allows turntable rotation without physically moving the tone arm over the turntable.

These and other objects of this invention are accomplished by a logic circuit coupled to movements of the tone arm. Two switches are used to sense horizontal and/or vertical movement of the tone arm. In a normal mode of operation the tone arm is moved horizontally towards the turntable and one switch will be closed initiating the turntable motor drive circuit. Also, if the arm is merely elevated using an elevation mechanism, a second switch is closed, similarly initiating the motor drive circuit. In the first case, normal operation of the turntable is effected with the tone arm on a record. In the second case, the tone arm is disposed in a location outside the vicinity of the turntable, but rotation thereof occurs, allowing the record to be cleaned.

DESCRIPTION OF THE PREFERRED EMBODIMENT

This invention will now be described with reference to the accompanying drawings.

Figure 1:
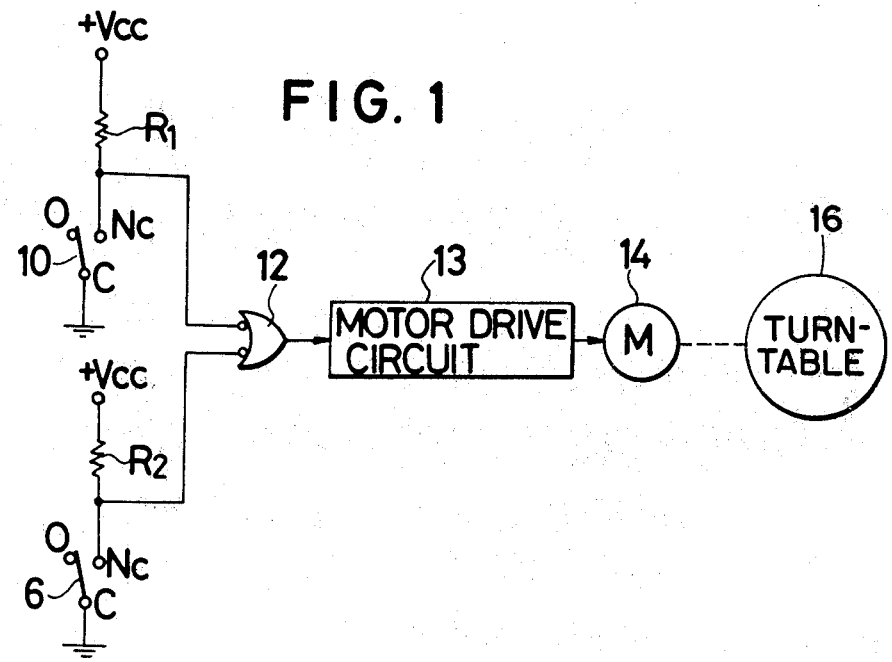
FIG. 1 is a circuit diagram showing one embodiment according to this invention.

A tone arm 1 is supported by an arm shaft 2 for horizontal movement thereabout. When the record on the turntable is not played, the tone arm 1 is positioned on an arm rest (not shown) and in this position the tone arm 1 lies slightly above an arm elevation plate 4 (FIG. 2(b)). The lower end of an elevation shaft 5 is designed to abut a contact 7 of a switch 6. When the elevation mechanism is not operated, the contact 7 is depressed by the elevation shaft 5. In this condition, a grounded contact C of a switch 6 is connected to a fixed contact O thereof as shown in FIG. 1, thereby causing an open circuit.

Figure 2A:
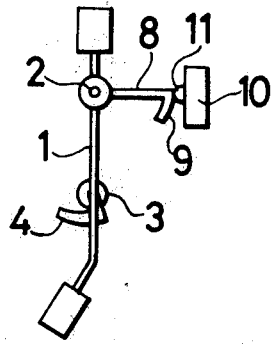
FIGS. 2(a) and 2(b) are a plan view and side view, respectively, showing the relationship between switches and the tone arm as shown in FIG. 1.
Figure 2B:
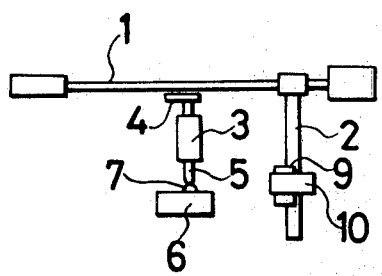

An actuating member 8 (FIG. 2(a)) is integrally provided in the arm shaft 2 in such a manner that it projects in the radial direction of the locus of tone arm rotation. A projecting piece 9 is provided in the tip end of the actuating member 8 and extends to the clockwise direction of the tone arm rotation. The projecting piece 9 has a substanial arcuate side surface extending in the tone arm rotation direction.

As shown in FIG. 2(a), when the tone arm is placed on the arm rest, uppermost position of the projection piece 9 abuts and depresses the contact 11 of the switch 10. This position corresponds to the condition shown in FIG. 1 of a grounded movable contact C of a switch 10 in contact with an open fixed contact O. Fixed contacts $N_c$ of the switches 6 and 10 are connected through resistors $R_2$ and $R_1$ to positive batteries $V_{cc}$, respectively. Both the fixed contacts $N_c$ are independently led to the two input terminals of an OR gate 12 to which inverted signals are used as inputs. The output of the OR gate 12 is used as an input to a motor drive circuit 13 which drives the phono-motor 14 to thereby rotate the turntable 16.

In operation in the situation where the tone arm is positioned on the arm rest, the input signals to the OR gate 12 are both positive (high level) before inversion and therefore the output thereof is negative (low level). As a result, the motor 14 does not rotate. When the tone arm moves horizontally towards the turntable from the position of the arm rest, the engagement between the contact 11 and the projecting piece 9 is released and the movable contact arm of the switch 10 contacts the fixed contact $N_c$. As a result, one input signal of the gate 12 is changed to low level signal and thus the output thereof becomes high level. Consequently, OR conducts and the motor drive circuit is actuated. The turntable is therefore rotated. The operation of the turntable in this case is similar to the conventional operation. However, if only the elevation mechanism 3 is operated to elevate the tone arm without horizontally moving the tone arm, the shaft 5 is released from the engagement with the contact 7 and the input terminal of the OR gate 12 connected to the fixed contact $N_c$ of the switch 6 becomes low level, and the output of the gate 12 becomes positive. The motor 14 is driven in response to the output of the motor drive circuit 13.

As described, it is possible according to this invention to rotate the turntable merely by an elevation instuction for the tone arm. Further, it becomes unnecessary to move the tone arm towards the turntable when it is desired to rotate the turntable. Hence, the cleaning of the record can be performed without any danger of injury to the stylus.

It is also possible to modify this invention by providing a structure in which the elevation mechanism does not cause the tone arm to elevate when the tone arm is positioned on the arm rest. More specifically, it the portion of the elevation plate beneath the tone arm at the time when the tone arm is positioned on the arm rest is downwardly bent, the tone arm is not elevated above the arm rest even though the elevation mechanism is actuated. Although part of the elevation plate is bent downward, it is still useful, in that the tone arm is maintained slightly above the record on the turntable when the tone arm is manually moved to the outer pheriphery of the record. Hence, with the modification a record or stylus is not damaged.

It is evident that other various modifications and variations of this invention are possible without departing from the essential scope of this invention. For example, NOR logic may be employed. Also, the switches could be reversed to a normally closed positioned or their positions relative to the tone arm be varied so long as the essential requirements of sensing both horizontal and vertical movements are satisfied.

What is claimed is:

1. In a device for use in a record player including a turntable, a horizontally and vertically movable tone arm, an arm rest for resting said tone arm thereon, the improvement comprising:
   (a) first detecting means for detecting the horizontal movement of said tone arm from said arm rest, said first detecting means including first switch means and an actuating member integral with said tone arm for actuating said first switch means to produce a first signal when said tone arm is moved horizontally from said arm rest;
   (b) second detecting means for detecting the vertical movement of said tone arm, said second detecting means including second switch means and vertically movable tone arm elevating means for elevating said tone arm from said arm rest, said second switch means being directly actuated by said elevation means upon upward movement thereof to produce a second signal independent of said first signal;
   (c) a logic gate circuit responsive to either of said first and second signals for producing an output signal; and
   (d) a driving circuit connected to said logic circuit and responsive to said output signal for driving said turntable.

2. The improvement of claim 1 wherein said logic sum gate circuit comprises an OR gate.

3. The improvement of claim 1 wherein said first and second switch means are normally opened.

* * * * *